United States Patent Office 3,220,834

Patented Nov. 30, 1965

3,220,834
PROCESS FOR STORAGE AND RETRIEVAL OF INFORMATION

Richard M. Scribner, Wilmington, Del., assignor to E. I. du Pont de Nemours and Company, Wilmington, Del., a corporation of Delaware No Drawing. Filed June 20, 1962, Ser. No. 203,747
9 Claims. (Cl. 96—27)

This invention relates to a new process for the storage and retrieval of information. More particularly, it relates to a new system for the storage and retrieval of information and to elements useful therein, which system involves the formation of a colored image, signal, or information bit, which is sensible visually or by other optical systems, and a corresponding paramagnetic image, signal, or information bit of varying intensity corresponding to the varying intensity of the colored image, which paramagnetic image is separately sensible by paramagnetic means.

Information storage and recovery systems are of rapidly increasing importance in the present-day economy in view of the exponential rise in the number and complexity of the data which must be recorded and be retrievable to handle the increasing every-day business load, and to assist in scientific developments. Many optical systems, including those based on silver halide emulsions and the like, have contributed significantly to this development, largely because of the high packing density with good retrievable resolution inherent in such systems. Systems based on magnetic means, e.g., the well-known magnetic tape and magnetic ink check-printing systems, have likewise found great utility, largely because of the relative ease of handling and the relatively simple equipment involved, combined with, particularly in the case of the tapes, high reproducible fidelity. However, the optical systems are not as versatile as desired in that only a single image is normally recorded at any one bit, e.g., the developed Ag image. The same is true of the magnetic tape images where normally only the magnetic image is obtained at any one bit. This image can be made visual by a separate step, e.g., by dusting with iron powder. The magnetic ink images have the advantage of being both visually and magnetically sensible; however, these images suffer from a relatively low packing density.

A new information storage and recovery technique has now been discovered which has all the advantages of the previously known systems, including high packing density, good resolution, and high fidelity, and at one and the same time provides both a paramagnetic and a visual image. These concurrent images can be sensed separately by either visual or other optical means, as well as by paramagnetic sensing means, and both images vary in intensity as a function of the modulations of the energy read-in beam means. The operable energy read-in means include visible, X-ray, infrared, or ultraviolet radiation. The operable modulating means for these energy read-in means include suitable filters, images, or screens; and the possibility of allied controlled circuitry. The read-out means for retrieval are presently commercially available for sensing both the visual and the paramagnetic images. Any optical system capable of judging gradation in tonality or coloration is capable of reading out the visual image. The paramagnetic resonance instruments presently on the market are all capable of reading out the paramagnetic signal.

The over-all technique can broadly be achieved in two fashions, irrespective of the previously outlined variables permitted. Thus, the desired visual contrast and paramagnetic intensity background can be prepared in toto initially, with the image being stored in said visual and paramagnetic background image by suitably destroying both the visual and paramagnetic background by imagewise exposure to light or heat or the above-described beams. The modulation will be as above, and the image bit, pattern, or signal will appear as a decrease in both the visual and paramagnetic background. In this sense, this technique may be regarded as the formation of a negative image. However, obviously, the difference in both visual and paramagnetic intensities can easily be sensed.

In the other broad approach in this new technique, the joint i.e. coextensive visual and paramagnetic image, bit, pattern, or signal will be obtained as a function of the modulated energy read-in means, and the starting recording member will contain neither. Thus, the joint visual and paramagnetic images will be formed directly from the modulated read-in energy means in intensities varying with the modulation.

Within the purview of the foregoing two broad techniques for operating the new information storage and recovery system the paramagnetic bit, pattern, or signal will always arise from a 7,7,8,8-tetracyanoquinodimethan (TCNQ) or alkyl substituted TCNQ anion-radical, generally present in salt form associated with a cation, which anion-radical containing materials are properly classed as charge-transfer compounds. In all instances, the anion-radical with the associated cation will also contribute significantly to the visual image since such anion-radical salts are generically highly colored. In many instances, the total visual signal or bit will also contain a significant contribution from another species than the anion-radical with associated cation. Thus, for instance, in the recording and recorded members based on photographic silver halide emulsions containing in operative association therewith a suitable source of the anion-radical, there will not only be obtained the visual and paramagnetic signal, bit, or trace of the silver anion-radical salt, but there will also be obtained the conventional photographically developed metallic silver. This joint silver/silver anion-radical paramagnetic species is sensible visually or by optical means. It is also sensible in such form by paramagnetic sensing means.

Furthermore, by this technique there is essentially a third signal resident in such a recorded member, in that the developed silver can be bleached by conventional means, leaving just the silver anion-radical salt image. This last is sensible visually or by other optical means and in a different area of the spectrum from the original joint silver and silver anion-radical salt image. The silver anion-radical salt image is also sensible by paramagnetic means.

Thus, with the silver halide photographic emulsions having in operative association therewith a source of a TCNQ or alkyl TCNQ anion-radical, information can be recorded and stored in the film by light exposure with suitable modulation via a screen, filter, or the like, or for that matter by using a moving light beam. After such exposure and development by conventional techniques, there is obtained a triple image of the read-in:

(1) The visually sensible (or by other optical means) joint siliver/silver anion-radical salt image;

(2) The paramagnetic image sensible by paramagnetic means arising from the joint silver/silver anion-radical salt image; and (3) The silver anion-radical salt image, which is sensible visually or by other optical means and in a different area of the spectrum sensing range than the joint silver/silver anion-radical salt image and is also sensible by paramagnetic means.

It should be added that the paramagnetic image is sensible at the same relative intensity in both the combined silver/silver anion-radical image and just the silver anion-radical salt image itself.

In the present information storage and retrieval systems where read-in is by modulated light, several variable techniques can be used to arrive at the same end-point. Thus, as illustrated specifically in the following examples, a conventional silver halide-based photographic film will be exposed to patterned light for the information read-in. Development will be by interaction between the exposed film and the reduced, i.e., dihydro, form of the TCNQ or alkyl TCNQ anion-radical moiety. The resultant oxidation reduction development reactions which occur concurrently will result in the formation patternwise in the exposed areas of the joint metallic silver/silver anion-radical salt visual and paramagnetic image.

Alternatively, the silver halide film will be prepared in such fashion that dispersed substantially uniformly throughout the light-sensitive emulsion will be the oxidized form of the anion-radical forming moiety. Following conventional patternwise light exposure and ordinary photographic development, again, the conjoint silver/silver anion-radical salt visual and paramagnetic image will be obtained. Still another way to arrive at the same joint image is to carry out a patternwise light exposure of a conventional silver halide photographic film, followed by normal development with a photographic developer to afford the silver image and subsequent modification or toning thereof by treatment with a source of the organic anion-radical.

Modulated light read-in and visual or other optical system read-out and paramagnetic read-out form an especially preferred embodiment of the present new system, primarily because of the high packing density and high resolution inherent in the photographic system. While silver halide conventional photographic emulsions will normally be used for such material, systems based on other metals and chemicals can be used, such as $$Ag_2C_2O_4 \xrightarrow{h\nu} Ag^\circ + CO_2$$

followed by treatment with a source of the anion-radical to develop the paramagnetic image.

While modulated light read-in is the preferred technique, several other ways exist whereby the joint visual and paramagnetic images of the present improved systems can be obtained. For instance, modulated heat affords a simple and convenient manner for information read-in. This technique has the further advantage of requiring no development step since the joint visual and paramagnetic image is formed directly, i.e., without the necessary separate development step of the photographic type read-in. Thus, a polyvinyl alcohol film impregnated with a silver salt, when exposed patternwise to heat, forms a metallic silver image in the heated areas. If, prior to exposure, a suitable source of the anion-radical is applied as a layer or dispersed throughout such film, the patternwise heat exposure results in the formation of a silver anion-radical salt sensible both visually and paramagnetically. The paramagnetic image can also be formed in a separate step after formation of the silver image by exposure to a source of the anion-radical.

Similar such results are obtained by patternwise exposure with heat of a multistrata film structure wherein the cation needed to form the colored and paramagnetic image was dispersed in one stratum in a low-melting binder, such as wax, with the complementary anion-radical former dispersed in a separate stratum in the same or different low-melting binder. Patternwise heat exposure causes the layers to flow together in the heated areas, permitting the reactants to form the desired visible and paramagnetic species in the heated areas.

Charge-transfer compounds are well known in the art, although in the older art they were frequently referred to as pi complexes. However, in recent times the concept has become well established that these complexes or compounds are more properly described in the generic sense as charge-transfer compounds—see, for instance, Mulliken, J. Am. Chem. Soc., 74, 811 (1952).

As to the 7,7,8,8-tetracyanoquinodimethan (TCNQ) and the corresponding ring alkyl-substituted quinodimethans as well as, of course, the corresponding reduced form of such compounds, e.g., $H_2$TCNQ and the like, these anion-radical precursors exhibit several properties necessary for use in this invention, viz., the oxidized form of the radical precursor is capable of reduction to the anion radical, the dihydro form of the radical precursor is oxidizable by $Ag^+$ or the oxidized form is capable of reduction to ion radical, e.g.

$$\text{TCNQ (in film)} + Ag^\circ \rightarrow TCNQ^- + Ag^+$$

and the dihydro or reduced form of the radical precursor as its anion is at least slightly water soluble. Suitable species of these additional operable anion-radical formers include 2-methylTCNQ, 2,5-dimethylTNCQ, 2-propylTNCQ, and the like. These compounds are disclosed and claimed in the copending application of Acker and Blomstrom, now U.S. Patent 3,115,506.

The present invention is generic to the use of paramagnetic charge-transfer compounds having the above-listed properties as basis for an information storage and retrieval system. The preceding discussion details several operable species for conjoint use with a cation-producing compound, such as a suitable Lewis base or metal, e.g., in particular with metallic silver, in various radiation modulated systems. Other Lewis bases are also operable.

Suitable Lewis bases are the amines and various alkyl and aryl hydrocarbon-substituted amines which may be described structurally by the following two formulas:

where $R_1$, $R_2$, $R_3$ are H, alkyl, or alkylene up to 10 carbons and when $R_1$ is aryl, $R_2$ and $R_3$ are H or alkyl up to 20 carbons, and the corresponding quaternary ammonium salts as below.

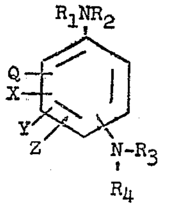

where the amino substituents are ortho or para to each other and $R_1$, $R_2$, $R_3$, $R_4$ are alkyl up to 20 carbons and Q, X, Y, Z are H or hydrocarbon up to 20 carbons, which can be together joined, or other ortho- or para-directing substituents with the provisos that (1) when $R_1$, $R_2$, $R_3$, and $R_4$ are alkyl, Q and X are H, (2) when $R_1$ and $R_3$ are aryl, $R_2$ and $R_4$ are H or alkyl, and (3) where Q–X and/or Y–Z taken pair-wise are cycloalkylene or fused aromatic, $R_1$ and $R_3$ are H, and the corresponding quaternary ammonium salts wherein the quaternary radical is another $R_1$, $R_2$, $R_3$, $R_4$ and any of the usual anions is involved.

Also included are the substituted amines of the alkyl and aryl hydrocarbon-substituted types defined by the foregoing two structural formulas wherein $R_1$, $R_2$, $R_3$, and/or $R_4$ are variously oxaalkylene or thiaalkylene or oxaalkyl or thiaalkyl, e.g., 4-thiapiperidine, as well as the hydroiodides of the foregoing primary, secondary, or tertiary amines, and also the corresponding quaternary ammonium iodides, e.g., morpholine hydroiodide; all heterocycles containing nuclear nitrogen and the hydroiodides or alkyl iodide salts thereof; substituted ethylenes of the type

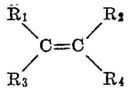

wherein from one to four of the $R_1$, $R_2$, $R_3$, or $R_4$ groups are amino or alkylamino, any remaining being alkyl, alkoxy, alkoxythio, aryl, aryloxy, or arylthio; and the hydroiodide or alkyl iodide salts thereof, including the plain iodides, e.g., of the aminium type $$R_3\overset{+}{N}I^-$$

and the Wurster iodides of aromatic amines, e.g., Wurster's blue iodide, $$(CH_3)_2\dot{N}C_6H_4\overset{+}{N}(CH_3)_2$$

(In the foregoing diamines, it is expressly intended to include polynuclear diamines in which the nitrogens are connected by a conjugated system.)

Suitable specific bases for making the charge-transfer compounds in molar ratios from 2/1 to 1/2 are given in the following list. In connection with the molar ratios just given, it is to be understood that the present charge-transfer compounds lie within the arithmetical range of the two molar ratio extremes and not solely at the extremes. Thus, charge-transfer compounds of the present invention are inclusive of, for instance, 3/2, 1.5/1, and the like charge-transfer compounds. Specific examples of bases include: ammonia, and amines, such as ethylamine, methylamine, dibutylamine, tridecylamine, and the like; diamines, such as 2,3-N,N,N',N'-hexamethyl-p-phenylenediamine, N,N'-dioctyl-1,5-diaminonaphthalene, 1,4-diamino-5,6,7,8-tetrahydronaphthalene, and the like; ammonium and quaternary ammonium bases and salts, such as ammonium iodide, ethyltrimethylammonium iodide, dioctylammonium iodide, methyltri-n-propylammonium iodide, tetramethylammonium hydroxide, and the like; heterocyclic aromatic amines, such as 4-aminopyridine, 3-dimethylaminocarbazole, 2-methoxyphenazine, and the like.

In addition to the silver and poly-N,N-diethylaminoethyl methacrylate base cation formers illustrated in detail in the specific examples, there can be used as the complementary color- and paramagnetic-forming coreactant of the present elements and new process any monomeric or polymeric base cation formers capable of forming with the aforesaid disclosed TCNQ components the requisite colored paramagnetic charge-transfer compound. Included in these are the aminoalkyl acrylate esters and their polymers such as the amino-, dimethylamino-, diethylamino-ethyl, -propyl, -butyl, and the like acrylate esters. Also useful are the aminoalkyl α-alkacrylate esters and their polymers such as aminoethyl, dimethylaminoethyl, diethylaminomethyl, α-ethyl, α-methyl, and the like acrylate esters and their polymers. Also useful are the polyalkylenimines such as the polyethylenimines, theN-methyl- and the N-ethylpolyethylenimines and the like, as well as the polypropylenimines, including the N-methyl- and N-ethylpropylenimines. Also useful are the various vinylpyridines and their polymers such as the 2-vinyl- and the 4-vinylpyridines and the like.

Whatever TCNQ compounds and bases are used, the paramagnetic image must have a half life greater than one day at normal conditions of temperature and pressure for obvious reasons of utility. The preferred images for obvious reasons of information storage will have a half life under the same conditions, preferably greater than six months and desirably greater than a year. For reasons of improved paramagnetic read-out, the preferred paramagnetic species in the signal areas will have high paramagnetic intensity. More specifically, the preferred species will have an EPR absorbence with a half-height band width of about 10 gauss.

The following examples in which the parts are by weight are submitted to further illustrate but not to limit the present invention.

*Example I*

Strips of a commercially available, fine-grain, safety-positive, photographic film were exposed for 15 seconds to light from a 100 watt incandescent lamp passing through a commercially available photographic stepwedge having 21 steps ranging in optical density from 0.06 to 3.19 in unit steps of about 0.15 units. As is conventional in the photographic art, the optical density D is given by the log of $$\frac{I_0}{I}$$

wherein $I_0$ is used to represent the initial light intensity and I, the light intensity after the light has been transmitted through the system involved. An alternative way of stating the same expression is to state that $$D=\log \frac{1}{T}$$

where T represents the transmittance—see page 89 of Miller, "Principles of Photographic Reproduction," Macmillan, New York, 1948.

The exposed film strips were then developed for 3.5 minutes in a developing tank containing a solution of 2.0 parts of 1,4-bis(dicyanomethyl)benzene, or p-phenylenedimalononitrile, i.e., dihydrotetracyanoquinodimethan ($H_2TCNQ$), in 400 ml. of a developer base stock solution prepared from 36 g. of sodium sulfite, 4.0 g. of potassium bromide, and 20 g. of sodium carbonate, all dissolved in one liter of water. The strips were then washed for about 20 seconds in water and fixed for ten minutes in 200 ml. of a solution prepared from 600 g. of sodium thiosulfite, 37.5 g. of sodium sulfite, 45 g. of borax, 30 ml. of glacial acetic acid, 50 g. of potassium alum, and 2500 ml. of water. After a thorough rinsing in water, the strips were wiped gently with soft tissue and dried. The exposed and developed strips contained metallic silver and bluish-purple silver tetracyanoquinodimethanide in the exposed areas.

The metallic silver was leached from one of the strips by washing it for five minutes in Farmers' Proportional Reducer Solution A comprising 7.5 g. of potassium ferricyanide in one liter of water, and then for four minutes in Solution B comprising 200 g. of sodium thiosulfate in one liter of water—see Handbook of Chemistry and Physics, 37th ed., Chemical Rubber Publishing Co., 1955–1956, at page 3021. The thus partially leached strip was rinsed for two minutes in water and treated again with solutions A and B for one minute and five minutes, respectively, and then given a final wash in water for 20 minutes. No metallic silver was visible in the thus completely leached strip. The remaining blue image was silver tetracyanoquinodimethanide with varying densities corresponding to the original exposure.

The optical densities and relative paramagnetic strengths of the various areas of the unreduced and reduced film strips were measured and both were shown to vary directly with the initial exposure of the film to light. The results are given in the following table, in which the paramagnetic intensity values are given in terms of the area in square centimeters under the paramagnetic signal curve developed from a 2.4 sq. cm. film sample of the respective step number with the signal being measured with a Varian Model V4500 electron paramagnetic resonance apparatus. The relative exposure values were calculated as the reciprocals of the antilogs of the optical densities of the specific step through which the films were exposed. The optical density values of the steps of the commercial stepwedge through which the film was exposed were obtained with the item of commerce. The optical density values reported for the various exposed areas of the film samples being tested were determined as transmission densities obtained on a Welch "Densicron" densitometer, as discussed in Review of Scientific Instruments, 19, 827 (1948).

UNREDUCED FILM ($Ag^{\circ}$+AgTCNQ)

| Step No. | O.D. of Step Through Which Film Exposed | Relative Exposure | O.D. of Exposed Film | Paramagnetic Signal Intensity |
|---|---|---|---|---|
| 0 | (1) | 0 | Nil | Nil |
| 1 | .06 | 91 | 3.08 | 1.08 |
| 2 | .20 | 63 | 2.85 | 0.91 |
| 3 | .35 | 46 | 2.59 | 0.79 |
| 4 | .51 | 31 | 2.32 | 0.69 |
| 5 | .67 | 21 | 1.98 | 0.48 |
| 6 | .81 | 15 | 1.63 | 0.43 |
| 7 | .96 | 11 | 1.33 | 0.34 |
| 8 | 1.12 | 7.7 | 1.09 | 0.31 |
| 9 | 1.27 | 5.3 | 0.90 | 0.21 |
| 10 | 1.43 | 3.7 | 0.74 | 0.19 |
| 11 | 1.59 | 2.6 | 0.65 | 0.17 |
| 12 | 1.75 | 1.8 | 0.60 | 0.14 |
| 13 | 1.91 | 1.2 | 0.59 | 0.13 |

REDUCED FILM (AgTCNQ)

| Step No. | O.D. of Step Through Which Film Exposed | Relative Exposure | O.D. of Exposed Film | Paramagnetic Signal Intensity |
|---|---|---|---|---|
| 0 | (1) | 0 | Nil | Nil |
| 2 | 0.20 | 63 | .71 | 0.27 |
| 4 | 0.51 | 31 | .61 | 0.21 |
| 6 | 0.81 | 15 | .39 | 0.18 |
| 7 | 0.96 | 11 | .26 | 0.11 |

*Example II*

To a solution of 40 ml. of 3 N ammonium bromide, 5 ml. of 0.5 N potassium iodide, and 25 ml. of a commercially available emulsifying agent at 10% concentration comprising a water-soluble polyethylene oxide ether of a fatty alcohol ("Emulphor ON") and 50 ml. of water was added under a red photographic safe light at 30° C. with moderate stirring over a period of about one minute a solution of 32 ml. 3 N silver nitrate, 20% aqueous ammonia in amount to just dissolve the brown silver hydroxide precipitate (about 17.5 cc. of 20% aqueous ammonia), and 200 ml. of water. The resultant mixture was stirred for 30 minutes at 30° C. and then allowed to settle for 20 minutes. The supernatant liquid was decanted. To the sedimented grains was added 20 ml. of 10% aqueous gelatin, and the solution was then stirred for 10 minutes at 40° C. One hundred milliliters of 20% aqueous gelatin was then added and the solution stirred for 5–10 minutes at 40° C. There was thus obtained a photographic emulsion of silver bromoiodide in a gelatin binder.

A solution of 0.5 g. of 7,7,8,8-tetracyanoquinodimethan (TCNQ) in 30 ml. of boiling acetonitrile was added quickly to a vigorously stirred mixture of 70 ml. of water and 10 ml. of the above 10% aqueous commercially available "Emulphor ON" emulsifier. The resultant yellow suspension was then added over a period of one to two minutes to the above silver bromoiodide emulsion in a gelatin binder at 40° C. with vigorous stirring over a period of one to two minutes. The resultant combined mixture was stirred at 40° C. for 10 minutes, allowed to cool to 32° C., and then coated as films one to twenty mils thick on a gelatin-subbed cellulose acetate film base and dried to yield a stable, storageable photographic film.

A strip of the above photographic film was partly covered with an opaque mass and exposed to light from a 100 watt incandescent lamp fo rabout ten seconds. Development of the thus exposed strip in a conventional commercially available metol/hydroquinone-type developer (Kodak D–72) for four minutes, followed by fixing in a conventional fixer solution for ten minutes, washing for 15 minutes, and subsequent careful drying afforded a film that was dark and strongly paramagnetic in the exposed area but was almost transparent and only very weakly paramagnetic in the unexposed area. The exposed areas comprised developer silver, i.e., Ag°, and AgTCNQide $$Ag^{+} + TCNQ^{\bar{\cdot}}$$

*Example III*

A solution of 49 parts of N,N-diethylaminoethylmethacrylate in about 60 parts of acetonitrile was refluxed over a period of 20 hours with the addition of four 0.067-g. portions of α,α-azobis(isobutyronitrile) at approximately equal intervals. The polymer solutions was diluted to 250 ml. with acetonitrile, and 250 parts of tetrahydrofuran was then added. A 94-ml. aliquot of this solution was admixed with 0.515 g. of 1,4-bis(dicyanomethyl)benzene, or p-phenylenedimalononitrile, i.e., $H_2$TCNQ, dissolved in 20 ml. of tetrahydrofuran and then with 1.53 g. of TCNQ in 200 ml. of tetrahydrofuran. The resulting black solution was concentrated to about 60 cc. by distillation under reduced pressure and then cast from a casting trough having a 10 mil opening onto commercially available polyethylene terephthalate film and dried at 80° C. under an atmosphere of nitrogen. There was thus obtained a glossy black film having an about one mil thick coating of poly-N,N-diethylammoniumethyl methacrylate/TCNQide coated on the polyester support. The film exhibited an optical density, determined as outlined above, of about 4.5 and strong paramagnetic intensity, determined again as above. Exposure of the thus prepared film to ultraviolet light for a period of 60 hours resulted in the bleaching of the black film from black-green to a very light transparent amber color. Concurrent with the decrease in optical density as a function of light exposure, there was also a decrease in the intensity of the paramagnetic signal, as evidenced in the following table:

| Hours | Color | Optical Density | Paramagnetic Signal Intensity |
|---|---|---|---|
| 0 | Black | 4.5+ | Strong. |
| 5 | do | 3.6 | |
| 10 | Dark green | 2.2 | |
| 15 | Light green | 2.1 | Moderately strong. |
| 20 | Amber-green | 1.5 | |
| 40 | Amber | 0.3 | |
| 60 | Very light amber | 0.2 | Very weak. |

To show that an EPR image is not a necessary result of the photographic process, a control sample of the commercial positive film used in Example I was exposed as thereunderneath a commercially available photographic stepwedge and then developed with a conventional metol/hydroquinone developer. Six steps from the developed strips with optical densities ranging from 0.04 to 2.48 were checked for the presence of paramagnetic species, as in Example I using the Varian instrument. The resultant EPR signal was quite weak and, more importantly, was constant (± 5% instrument error) in the six steps. As has been shown in Example I the more intense paramagnetism of $$Ag^{+}TCNQ^{\bar{\cdot}}$$

varies linearly with the exposure and also the intensity of the silver image, showing an eightfold increase of paramagnetism in steps with optical densities ranging from 0.59 to 3.08 as measured on the developed film.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for storage and retrieval of information which comprises:
   (a) exposing imagewise a recording member containing light sensitive silver halide to modulated energy read-in means selected from the group consisting of visible light, ultraviolet, X-ray and infrared radiation;
   (b) developing the exposed recording member with a silver halide developer;
   (c) reacting said exposed and developed member with a compound selected from the group consisting of 7,7,8,8-tetra-cyanoquinodimethan and ring-substituted lower alkyl derivatives thereof; and
   (d) retrieving the sensible information stored in the recorded member by image sensing means selected from the group consisting of paramagnetic sensing means and combined optical and paramagnetic sensing means.

2. Process of claim 1 wherein the modulated read-in means is actinic light.

3. In the process for storage and retrieval of information by initial imagewise exposure to actinic light of a photographic film containing a silver halide emulsion, the improvement which comprises:
   (a) developing said exposed film with a developer containing a compound selected from the group consisting of dihydrotetracyanoquinodimethan and ring-substituted lower alkyl derivatives thereof; and
   (b) retrieving the sensible imagewise-stored information in said exposed and developed film by image sensing means selected from the group consisting of paramagnetic means and combined optical and paramagnetic sensing means.

4. Process for storage and retrieval of information which comprises:
   (a) exposing a recording member imagewise to modulated energy read-in means selected from the group consisting of visible light, ultraviolet, X-ray and infrared radiation; said recording member comprising a base provided with a coating of a stable emulsion of light sensitive silver halide and a compound selected from the group consisting of 7,7,8,8-tetracyanoquinodimethan and ring-substituted lower alkyl derivatives thereof;
   (b) developing the exposed recording member with a silver halide developer, and
   (c) retrieving the information stored in the coating by image sensing means selected from the group consisting of paramagnetic sensing means and combined optical and paramagnetic sensing means.

5. The process of claim 4 wherein the modulated read-in means is actinic light.

6. The process of claim 4 wherein the emulsion coating comprises a silver halide and 7,7,8,8-tetracyanoquinodimethan.

7. Process for the storage and retrieval of information which comprises:
   (a) exposing imagewise to modulated energy read-in means selected from the group consisting of visible light, ultraviolet, X-ray, and infrared radiation, a recording member comprising a base layer and a coating of a salt charge-transfer compound, said salt charge-transfer compound consisting of a cation selected from the class consisting of silver, ammonia, and amines, and the anion is selected from the class consisting of 7,7,8,8-tetracyanoquinodimethanide and ring-substituted lower alkyl derivatives thereof; and
   (b) retrieving the sensible information stored in the coating by image sensing means selected from the group consisting of paramagnetic sensing means and combined optical and paramagnetic sensing means.

8. The process of claim 7 wherein the modulated read-in means is actinic light.

9. The process of claim 7 wherein the salt charge-transfer compound is poly-N,N-diethylammoniumethyl methacrylate/tetracyanoquinodimethanide.

References Cited by the Examiner

UNITED STATES PATENTS

| | | | |
|---|---|---|---|
| 2,819,963 | 1/1958 | Hamm | 96—94 |
| 2,881,073 | 4/1959 | Maclay | 96—27 |

OTHER REFERENCES

Chemical and Engineering News, vol. 40, No. 9, Feb. 26, 1962, pp. 86 to 90, 92, 94 and 95.

NORMAN G. TORCHIN, *Primary Examiner.*